(12) United States Patent
Ogasawara

(10) Patent No.: US 10,949,139 B2
(45) Date of Patent: Mar. 16, 2021

(54) PRINTING APPARATUS HAVING A PREDETERMINED MEMORY USED AS SPOOL BUFFER FOR PRINT JOBS

(71) Applicant: CANON KABUSHIKI KAISHA, Tokyo (JP)

(72) Inventor: Yasufumi Ogasawara, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/731,204

(22) Filed: Dec. 31, 2019

(65) Prior Publication Data

US 2020/0241808 A1   Jul. 30, 2020

(30) Foreign Application Priority Data

Jan. 24, 2019  (JP) .............................. JP2019-010539

(51) Int. Cl.
*G06F 3/12* (2006.01)
(52) U.S. Cl.
CPC ............ *G06F 3/122* (2013.01); *G06F 3/1238* (2013.01); *G06F 3/1267* (2013.01); *G06F 3/1286* (2013.01)
(58) Field of Classification Search
None
See application file for complete search history.

(56) References Cited

U.S. PATENT DOCUMENTS

2012/0148323 A1*  6/2012  Shimada .............. G06F 3/1285
                                                              400/76
2018/0275939 A1    9/2018  Kanai

FOREIGN PATENT DOCUMENTS

JP    2006341496 A   * 12/2006
JP    2018-158554 A    10/2018

OTHER PUBLICATIONS

English translation of Japanese Patent Application 2005-169442 (corresponding to Japanese Application Publication 2006-341496), Mikami. (Year: 2005).*

* cited by examiner

*Primary Examiner* — Thomas D Lee
(74) *Attorney, Agent, or Firm* — Venable LLP

(57) ABSTRACT

A printing apparatus accepts an input related to a secure print job, controls a size of a spool area in a predetermined memory for secure print jobs in response to an input related to the accepted secure print job, and executes secure printing based on the secure print job in response to a user operation. Non-secure printing is executed based on a non-secure print job without a user operation being performed, acceptance of the input related to the secure print job is acceptance of an input indicating that an environment of the printing apparatus is an environment in which secure printing is executed more than non-secure printing, and in response to the accepted input, the size of the spool area for secure print jobs in the predetermined memory becomes larger than a size of a spool area for non-secure print jobs in the predetermined memory.

19 Claims, 9 Drawing Sheets

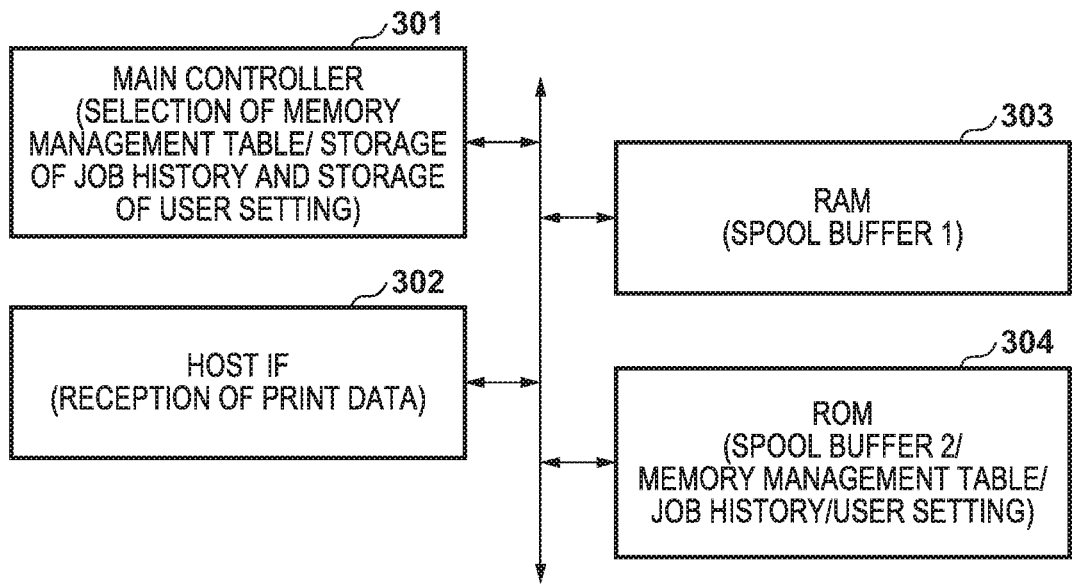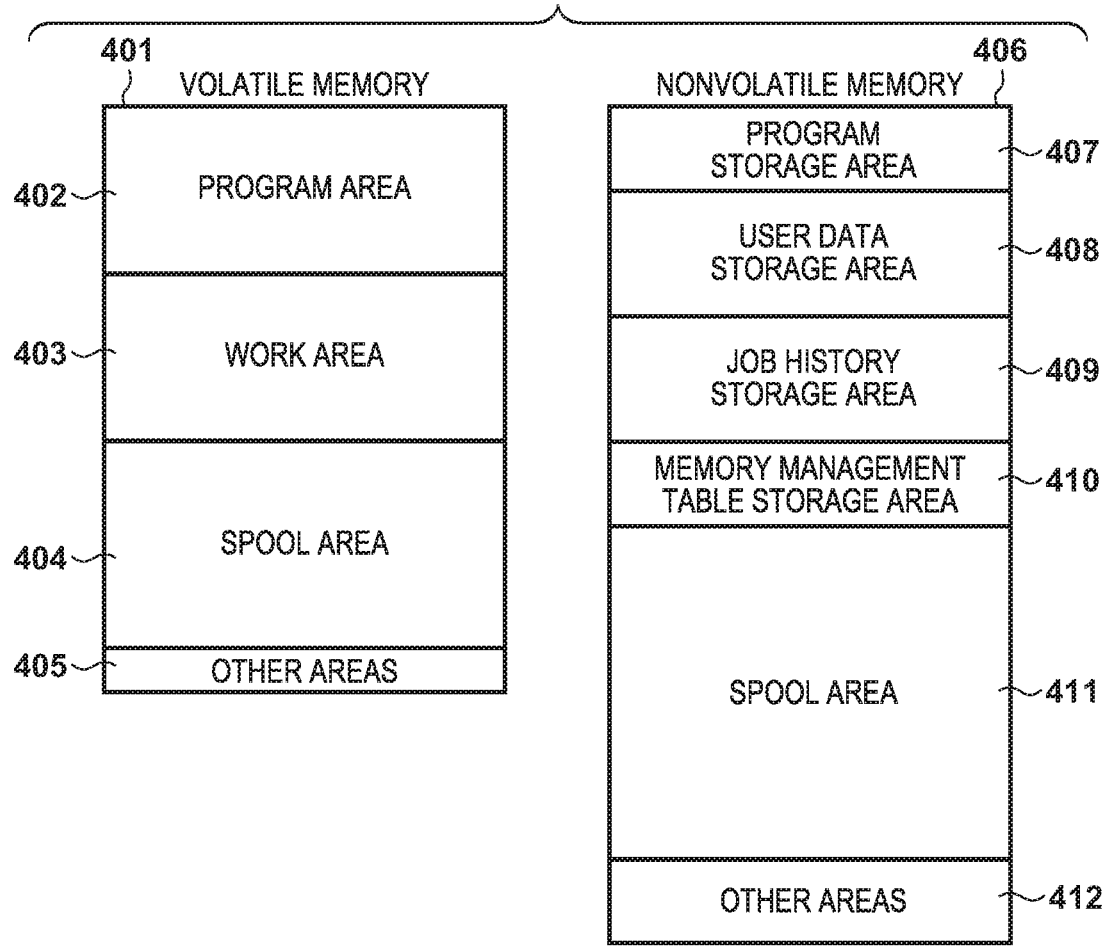

PRINTING APPARATUS HAVING A PREDETERMINED MEMORY USED AS SPOOL BUFFER FOR PRINT JOBS

BACKGROUND OF THE INVENTION

Field of the Invention

The present invention relates to a printing apparatus, a control method, and a storage medium for storing a program.

Description of the Related Art

A printer shared by a plurality of users in an office or the like is usually installed on a local network of the office. In this environment, print data is often transmitted from an individual user's information terminal to a printer via a network, and each user goes to the printer to pick up their own printed matter. There are cases where confidential information is included in printed matter output by the user, and if the printer outputs the printed matter immediately after the user transmits the print data, the following problems occur. That is, if the user takes a while to go and pick up the printed matter, there is a risk that the confidential information printed on the printed matter may come into contact with the eyes of other users, or the printed matter may be taken away by another person in some cases.

For this reason, in a printer shared in an office, there are cases where a method is employed in which, after a user transmits print data, print output is not performed until the user actually goes to the printer and starts actual printing after the user has permitted the printing at the printer. From the viewpoint of information security, such a printing method is called secure printing.

Japanese Patent Laid-Open No. 2018-158554 describes a configuration in which the job status of a print job for which a secure print setting has been made is appropriately notified to a PC side.

Incidentally, as secure printing becomes widespread, there is a demand to appropriately control the size of a spool area for secure print jobs in a memory.

SUMMARY OF THE INVENTION

The present invention provides a printing apparatus for appropriately controlling the size of a spool area for secure print jobs in a memory, a control method, and a storage medium that stores a program.

The present invention in one aspect provides a printing apparatus having a predetermined memory used as a spool buffer for print jobs, the apparatus comprising: an acceptance unit configured to accept an input related to a secure print job; a control unit configured to control a size of a spool area for secure print jobs in the predetermined memory in response to an input related to the accepted secure print job; and a printing unit configured to execute secure printing based on the secure print job in response to a user operation on the printing apparatus being performed after the secure print job is transmitted from an information processing apparatus.

According to the present invention, it is possible to appropriately control the size of a spool area for secure print jobs in a memory.

Further features of the present invention will become apparent from the following description of exemplary embodiments with reference to the attached drawings.

BRIEF DESCRIPTION OF THE DRAWINGS

FIG. 3 is a diagram illustrating a configuration of a main controller, a ROM, and a RAM.

FIG. 4 is a diagram illustrating memory maps.

DESCRIPTION OF THE EMBODIMENTS

Figure 1:
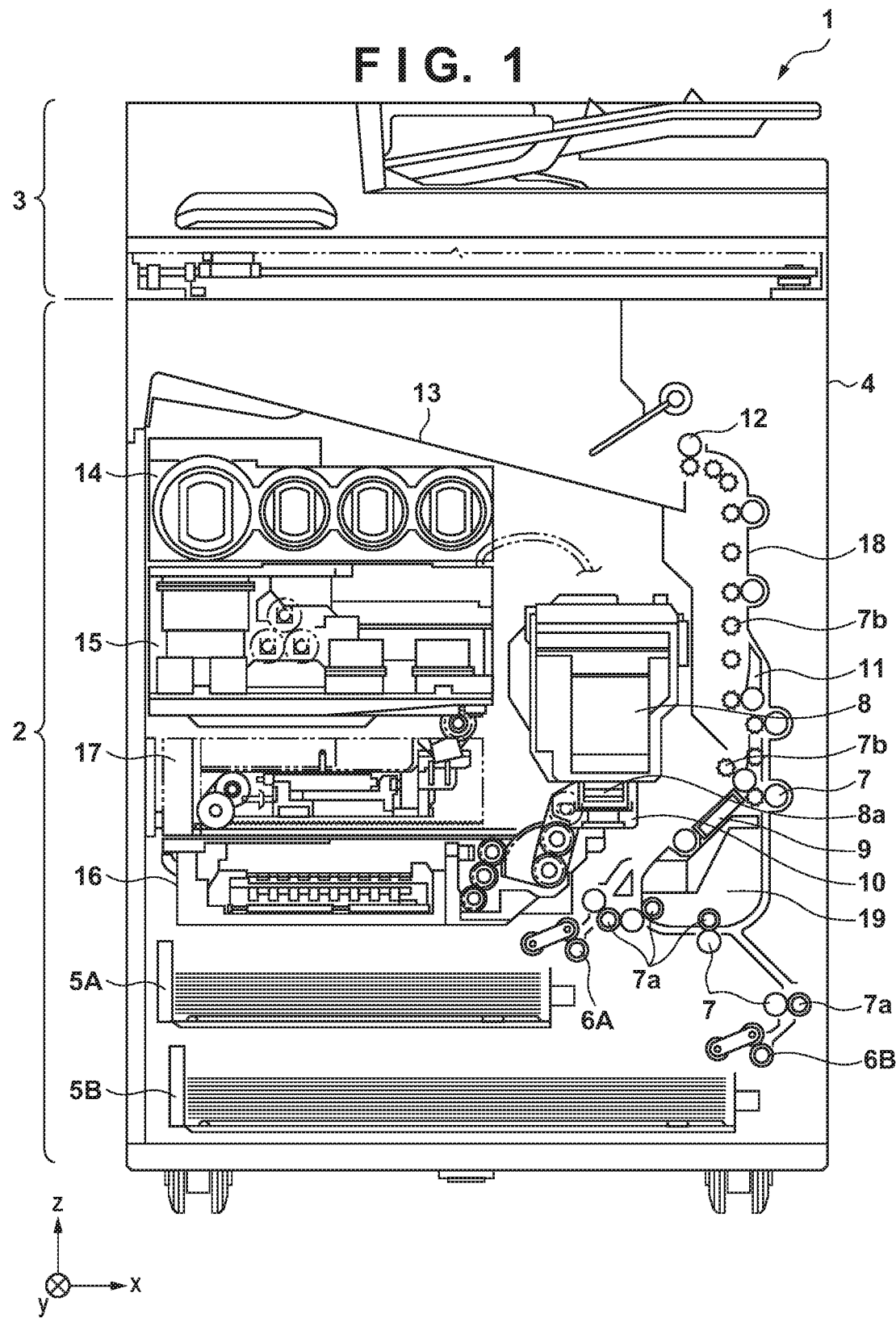
FIG. 1 is a diagram illustrating a configuration of a printing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

A printing apparatus according to the present embodiment will be described. It is assumed that the printing apparatus in the present embodiment is an apparatus that performs printing using ink as a printing agent by an inkjet method, but there is no limitation to this form. For example, the printing apparatus may be an apparatus that performs printing using toner as a printing agent in accordance with an electrophotographic method. FIG. 1 is an internal configuration diagram of an inkjet printing apparatus 1 used in the present embodiment (hereinafter referred to as a printing apparatus 1 or a printer 1). In the drawing, the x direction indicates the horizontal direction, the y direction (on the sheet surface, a vertical direction) indicates the direction along which discharge ports are arranged in a printing head 8 described later, and the z direction indicates the vertical direction.

The printing apparatus 1 is a multifunction peripheral that includes a printing unit 2 and a scanner unit 3, and can execute various processes relating to a printing operation and a reading operation by the printing unit 2 and the scanner unit 3 discretely or by the printing unit 2 and the scanner unit 3 interworking. The scanner unit 3 is provided with an ADF (Auto Document Feeder) and an FBS (flatbed scanner), and can read a document automatically fed by the ADF and read (scan) a document placed on a document platen of the FBS by a user. Although the present embodiment is a multifunction peripheral having both the printing unit 2 and the scanner unit 3, it may be configured such that it does not include the scanner unit 3. FIG. 1 illustrates a state in which the printing apparatus 1 is in a standby state in which neither a printing operation nor a reading operation is being performed.

In the printing unit 2, a first cassette 5A and a second cassette 5B for accommodating a printing medium (cut sheet) S are detachably installed in a bottom portion that is vertically below the housing 4. A relatively small printing medium of up to the A4 size is accommodated in a flat stack in the first cassette 5A, and a relatively large printing medium of up to the A3 size is accommodated in a flat stack in the second cassette 5B. In the vicinity of the first cassette 5A, a first feeding unit 6A for feeding the accommodated printing media separately one by one is provided. Similarly, a second feeding unit 6B is provided in the vicinity of the second cassette 5B. When a printing operation is performed, a printing medium S is selectively fed from one of the cassettes.

Conveyance rollers 7, a discharge roller 12, pinch rollers 7a, spurs 7b, a guide 18, an inner guide 19, and a flapper 11 are conveyance mechanisms for guiding the printing medium S in a predetermined direction. The conveyance rollers 7 are drive rollers that are arranged upstream and downstream of the printing head 8 and are driven by a conveyance motor (not illustrated). The pinch rollers 7a are driven rollers that, together with the conveyance rollers 7, nip and rotate the printing medium S. The discharge roller 12 is a drive roller that is arranged downstream of the conveyance rollers 7 and are driven by a conveyance motor (not illustrated). The spurs 7b sandwich and convey the printing medium S together with the conveyance roller 7 and the discharge roller 12 arranged downstream of the printing head 8.

The guide 18 is provided on the conveyance path of the printing medium S, and guides the printing medium S in a predetermined direction. The inner guide 19 has a side surface curved by a member extending in they direction, and guides the printing medium S along the side surface. The flapper 11 is a member for switching the direction in which a printing medium S is conveyed in a double-sided printing operation. A discharge tray 13 is a tray for stacking and holding a printing medium S discharged by the discharge roller 12 after the printing operation is completed.

The printing head 8 of the present embodiment is a full-line type color inkjet printing head, and a plurality of discharge ports for discharging ink in accordance with printing data are arranged along the y-direction in FIG. 1 in proportion to the width of a printing medium S. When the printing head 8 is in the standby position, a discharge port surface 8a of the printing head 8 is capped by the cap unit 10 as illustrated in FIG. 1. When a printing operation is performed, the orientation of the printing head 8 is changed by a print controller 122, which will be described later, so that the discharge port surface 8a faces the platen 9. The platen 9 is formed by a flat plate extending in the y direction, and supports the printing medium S on which the printing operation is performed by the printing head 8 from the back surface of the printing medium S.

An ink tank unit 14 stores four colors of ink to be supplied to the printing head 8. An ink supply unit 15 is provided partway through a flow path connecting the ink tank unit 14 and the printing head 8, and adjusts the pressure and flow rate of ink in the printing head 8 to an appropriate range. In the present embodiment, a circulation type ink supply system is employed, and the ink supply unit 15 adjusts the pressure of ink supplied to the printing head 8 and the flow rate of ink recovered from the printing head 8 to appropriate ranges.

A maintenance unit 16 includes the cap unit 10 and a wiping unit 17, and causes these to actuate at a predetermined time to perform a maintenance operation for the printing head 8.

Figure 2:
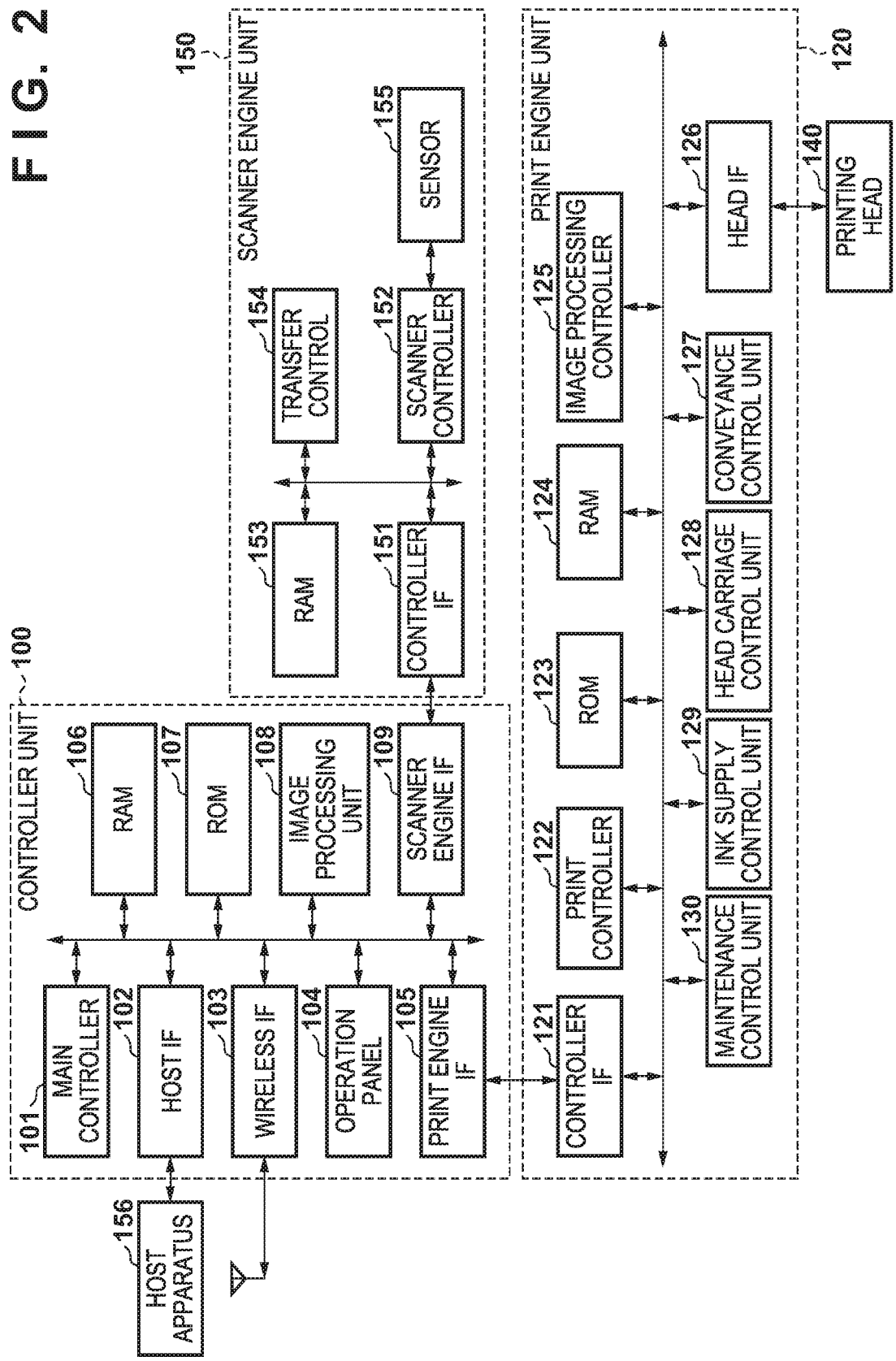
FIG. 2 is a diagram illustrating a block configuration of a control system of the printing apparatus.

FIG. 2 is a block diagram illustrating a control configuration in the printing apparatus 1. The control configuration mainly includes a print engine unit 120 that controls the printing unit 2, a scanner engine unit 150 that controls the scanner unit 3, and a controller unit 100 that controls the entire printing apparatus 1. The print controller 122 controls various mechanisms of the print engine unit 120 in accordance with instructions from a main controller 101 of the controller unit 100. Various mechanisms of the scanner engine unit 150 are controlled by the main controller 101 of the controller unit 100. Details of the control configuration will be described below.

In the controller unit 100, a main controller 101 that includes a CPU controls the entire printing apparatus 1 while using a RAM 106 as a work area in accordance with programs and various parameters stored in a ROM 107. A computer of the printing apparatus is formed by the main controller 101, the RAM 106, and the ROM 107. For example, when a print job is inputted from a host apparatus 156 via a host IF 102 or a wireless IF 103, an image processing unit 108 performs predetermined image processing on received image data in accordance with an instruction from the main controller 101. Then, the main controller 101 transmits the image data that has been subjected to the image processing to the print engine unit 120 via a print engine IF 105.

Note that the printing apparatus 1 may acquire image data from a host apparatus 156, which has a general-purpose information processing apparatus configuration, via wireless communication or wired communication, or may acquire image data from an external storage apparatus (such as a USB memory) connected to the printing apparatus 1. A communication method used for wireless communication or wired communication is not limited. For example, Wi-Fi (Wireless Fidelity) (registered trademark) or Bluetooth (registered trademark) can be applied as a communication method used for wireless communication. As a communication method used for wired communication, USB (Universal Serial Bus) or the like can be applied. Further, for example, when a read command is inputted from the host apparatus 156, the main controller 101 transmits the command to the scanner unit 3 via a scanner engine IF 109.

An operation panel 104 is a mechanism for a user to perform a user operation such as input/output with respect to the printing apparatus 1. Through the operation panel 104, a user can instruct an operation such as copying or scanning, set a print mode, or recognize information of the printing apparatus 1.

In the print engine unit 120, a print controller 122 that includes a CPU controls various mechanisms that the printing unit 2 is provided with while using a RAM 124 as a work area in accordance with programs and various parameters stored in a ROM 123. When various commands and image data are received via the controller IF 121, the print controller 122 temporarily stores the commands and image data in a RAM 124. The print controller 122 causes the image processing controller 125 to convert the stored image data into printing data so that a printing head 140 corresponding to the printing head 8 of FIG. 1 can be used for a printing operation. When the printing data is generated, the print controller 122 causes the printing head 140 to perform a printing operation based on the printing data via a head IF 126. At this time, the print controller 122 drives the feeding units 6A and 6B, the conveyance rollers 7, the discharge roller 12, and the flapper 11 illustrated in FIG. 1 via a conveyance control unit 127 to convey the printing medium S. In accordance with an instruction from the print controller 122, the printing operation in accordance with the printing head 140 is executed in conjunction with the conveyance operation of the printing medium S, and the printing process is performed.

A head carriage control unit 128 changes the orientation and position of the printing head 140 in accordance with an operation state such as a maintenance state and a printing state of the printing apparatus 1. An ink supply control unit 129 controls the ink supply unit 15 so that the pressure of the ink supplied to the printing head 140 falls within an appropriate range. A maintenance control unit 130 controls the operation of the cap unit 10 and the wiping unit 17 in the maintenance unit 16 when a maintenance operation is performed with respect to the printing head 140.

In the scanner engine unit 150, the main controller 101, in accordance with programs and various parameters stored in the ROM 107, controls the hardware resources of a scanner controller 152 while using the RAM 106 as a work area. As a result, various mechanisms included in the scanner unit 3 are controlled. For example, by the main controller 101 controlling hardware resources in the scanner controller 152 via a controller IF 151, a document arranged in the ADF by a user is conveyed via the conveyance control unit 127 and read by the sensor 155. The scanner controller 152 stores the read image data in a RAM 153. Note that the print controller 122 converts the image data acquired as described above into printing data, making it possible to cause the printing head 140 to perform a printing operation based on the image data read by the scanner controller 152.

FIG. 3 is an excerpt of blocks from FIG. 2 and a detailed description thereof. The main controller 101 and the host IF 102, RAM 106, ROM 107 in FIG. 2 correspond to a main controller 301, a host IF 302, a RAM 303, and the ROM 304 in FIG. 3, respectively. Print data received by the host IF 302 is temporarily stored in a spool buffer of the printer. An area for the spool buffer (a spool area) is reserved on the RAM 303 or the ROM 304. Here, the RAM 303 may be an SRAM in an IC for controlling the printer, or may be a DRAM outside the IC for controlling the printer, but since the spool buffer requires a relatively large-capacity memory area, the spool buffer will be described as a DRAM in the present embodiment.

The ROM 304 may be either a NOR type Flash or a NAND type Flash, description will be given of the ROM 304 as a NAND type Flash because of the necessity of a large capacity. For example, in the present embodiment, an eMMC in which wear leveling control is built into a chip is used. The area of the spool buffer on the eMMC may be a non-file system area that is directly visible from the CPU on a memory map, or may be a file system area that is accessed through the file system. In the present embodiment, a non-file system area will be described.

Since a ROM device has a limit on a number of writes, it is preferable to preferentially store spool data in a RAM which has no limit on the number of writes, and when the capacity of the spool buffer reserved in the RAM is exceeded, the ROM is used. Further, if the capacity (maximum amount) of the spool buffer of the RAM can be appropriately set in accordance with usage, the possibility that spool data will exceed the spool buffer of the RAM becomes low, and the problem of limitation of writing to the ROM will be reduced, and as a result, the product life time can be lengthened. Further, since the print data of a user may include confidential information, it is desirable to delete the print data from the printer after printing. When spool data is written to a RAM, even if a situation occurs in which there is a failure to delete print data, the print data in the RAM is deleted if power is not supplied to the printer. On the other hand, when spool data is stored in a ROM, two writes occur, i.e., storage and deletion of the print data, so that a limit on the number of writes is reached earlier. As described above, in FIG. 3, the RAM 303 is the spool buffer 1 which has a high priority, and the ROM 304 is the spool buffer 2 which has a low priority.

The ROM 304 is used not only as a spool buffer, but also for storing a memory management table, a job history of a user, and user setting information with respect to the spool buffer. The main controller 301 performs control for selecting a memory management table from the user setting information stored in the ROM 304, setting the capacities of the spool buffer 1 and the spool buffer 2, and allocating print job data to the respective spool buffers. The main controller 301 can also read a job history stored in the ROM 304, in particular, a history of a required spool buffer, and set the capacity of the spool buffer based on the read history. Details of the setting of the spool buffer will be described later. The memory management table may be a preset table, or may be a value specified by the user or a value derived from the history of the spool buffer.

Here, problems to be solved by the present embodiment will be described.

A printer shared by a plurality of users in an office or the like is usually installed on a local network of the office. In this environment, print data is often transmitted from an individual user's information terminal to a printer via a network, and each user goes to the printer to pick up their own printed matter. Although there are cases where confidential information is included in printed matter output by the user, if the printer outputs the printed matter immediately after the user transmits the print data, the following problem occurs. That is, if the user takes time to go and pick up the printed matter, there is a risk that the confidential information printed on the printed matter may come into contact with the eyes of other users, or the printed matter may be taken away by another person in some cases.

For this reason, in a printer shared in an office, there are cases where a method is employed in which, after a user transmits print data, print output is not performed until the user actually goes to the printer and starts actual printing at a timing when the user has permitted printing in front of the printer. From the viewpoint of information security, such a printing method is called secure printing. On the other hand, as in the former case, a method in which printing is started when print data is sent to a printer is called non-secure printing.

In order to provide an environment in which secure printing is possible, it is necessary to have a configuration in which print data is held without being printed out, and a configuration in which the printer identifies the user who transmitted the print data and performs actual printing out in accordance with permission of the correct user. As a configuration for identifying a user, for example, an ID number for identification is notified to the user every time a print job is generated, and the user inputs the ID number to the printer. As another configuration, identification information is registered in advance in an ID card held by a user, and when a print job is transmitted from an information terminal, the user ID is assigned to the job, so that the printer side associates the user with the job.

As a configuration for holding print data, a printer server for centrally managing print data is installed. The print data of each user is temporarily stored in the printer server, and when the user issues a print permission in front of the printer, the printer sends the ID of the user to the printer server, whereby the print data is transmitted from the printer server to the printer. Generally, temporarily storing print data is called spooling, and a memory area for spooling is called a spool buffer. The printer server is designed to enable the reservation of a spool buffer larger than the amount of print data envisioned for the size of an office. Further, as a configuration for preventing the spool buffer from overflowing, when a predetermined amount of time or more has elapsed from the generation of print data, the print data is deleted.

However, in the case of a small office environment, it may not be possible to install a printer server due to problems such as cost and location. When a printer server is not installed, print data from a user is directly transmitted to an individual printer shared on the network and spooled inside the printer.

When a spool buffer is provided inside the printer, a nonvolatile memory such as a DRAM or a hard disk drive (HDD), which is a volatile memory of the printer control unit, is used as the spool area of the spool buffer. The spool buffer is a temporary storage of data until the user permits print output, and generally it is not necessary to hold the data after the print output. For this reason, a DRAM which is a volatile memory is suitable for the spool buffer, but since there are cases where the capacity is insufficient to store print data transmitted by a plurality of users, an HDD which has a relatively low memory unit cost is often used as the spool buffer. However, an HDD has problems such as the possibility of mechanical failure such as a rotation mechanism of a disk, and the requirement for relatively high operating power. Therefore, there are cases where a nonvolatile semiconductor memory such as a NAND Flash is used. In particular, NAND Flash has decreased in cost in recent years, and its use as a spool buffer has been increasing.

NAND Flash memory has a limit on the number of writes, and when reading and writing with respect to a memory cell are repeated enough, the memory cell ceases to be usable. A set of unusable memory cells is treated as a defective block and alternative memory cells are allocated. If the number of defective blocks increases to such an extent that alternative memory cells cannot be allocated, a state in which the NAND Flash memory cannot be used as a memory having a prescribed capacity may occur.

Therefore, in the present embodiment, the size of a spool area for secure print jobs in the volatile memory is appropriately controlled. As a result, use of (access to) the nonvolatile memory is suppressed, and the lifetime of the nonvolatile memory is prolonged.

In addition, by controlling the size of the spool area for secure print jobs in the volatile memory to be a size that is appropriate in accordance with a secure print environment of the printing apparatus 1, it is possible to effectively utilize the area in the volatile memory other than that of the spool area for secure print jobs. According to the present embodiment, specifically, for example, when the printing apparatus 1 is in an environment in which secure printing is not performed much, the size of a spool area for secure print jobs in the volatile memory becomes small. Therefore, in an environment in which secure printing is not performed much, the printing apparatus 1 can effectively utilize the area other than that of the spool area for secure print jobs.

The memory area management of the ROM and RAM will be described with reference to FIG. 4. The RAM 303 of FIG. 3 corresponds to a volatile memory 401 of FIG. 4, and the ROM 304 of FIG. 3 corresponds to a nonvolatile memory 406 of FIG. 4. The volatile memory 401 and the nonvolatile memory 406 each illustrate an outline of memory area management in each memory. The volatile memory 401 includes a program area 402, a work area 403, a spool area 404, and other areas 405. The program area 402 is an area in which an execution program copied from, for example, the nonvolatile memory 406 is stored, and, for example, the CPU after booting operates by fetching a program from this area. An execution program may be fetched directly from nonvolatile memory. The work area 403 stores, for example, intermediate data that is being processed and the like. The spool area 404 may be used as a part of the work area.

The nonvolatile memory 406 includes a program storage area 407, a user data storage area 408, a job history storage area 409, a memory management table storage area 410, a spool area 411, and other areas 412. The program storage area 407 is an area in which an actual execution program can be stored, and for example, the CPU executes the program after copying the stored program to the volatile memory 401 to fetch it, or by directly fetching it from the nonvolatile memory 406. The user data storage area 408 stores various pieces of setting information related to the printer, such as a user telephone book or address book, an LCD brightness, and a UI sound volume setting, for example. For example, selection information of the memory management table is also stored in the user data storage area 408.

The job history storage area 409 stores the number of print jobs for a predetermined period of time such as one day or one week, the size of print data, an occupation ratio of the spool buffer, and the like. In the present embodiment, by using these pieces of information, a memory management table of the spool buffer can be selected in accordance with the environment in which the printer is installed. Details thereof will be described later. The spool area 411 is a storage location of spool data, and when spool data of a size that is greater than the spool area of the volatile memory 401 is generated, the spool buffer of the nonvolatile memory 406 is used.

Figure 5:
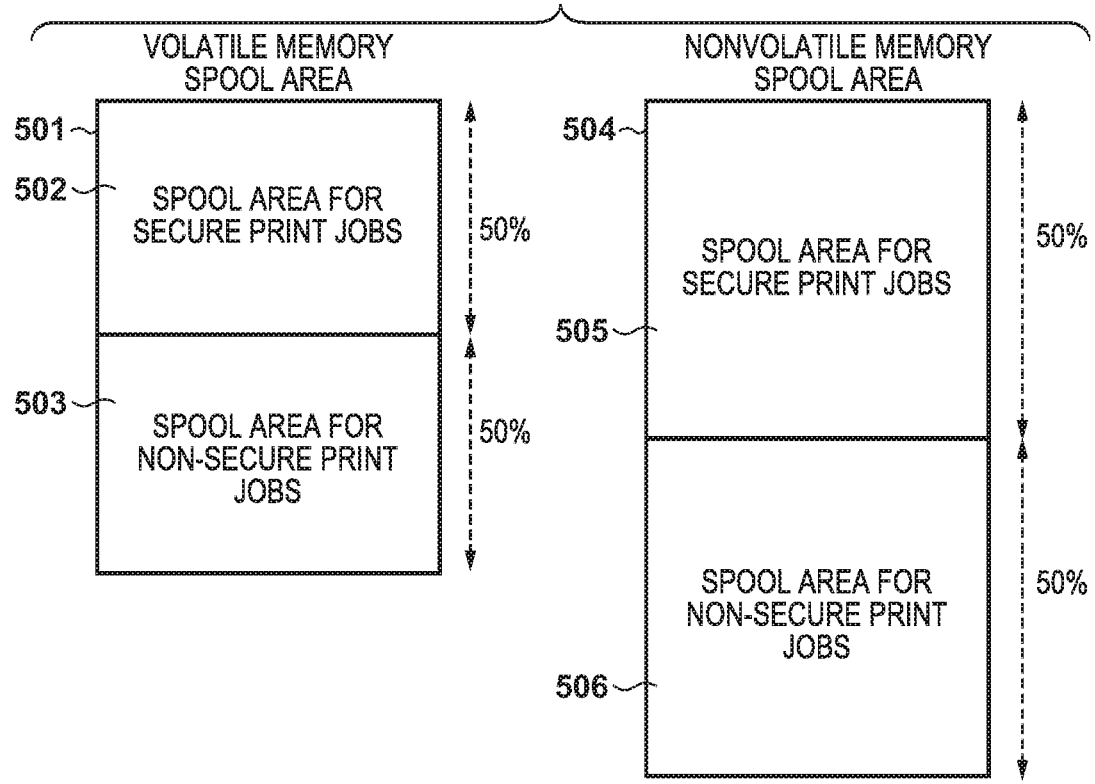
FIG. 5 is a diagram for describing allocation of spool areas.

Here, the setting of the spool areas of the volatile memory and the nonvolatile memory will be described with reference to FIG. 5. A volatile memory spool area 501 of FIG. 5 corresponds to the spool area 404 of FIG. 4. A nonvolatile memory spool area 504 of FIG. 5 corresponds to the spool area 411 of FIG. 4. In FIG. 5, the volatile memory spool area 501 is allocated to a spool area 502 for secure print jobs and a spool area 503 for non-secure print jobs at a proportion of 50% each so as not to overlap each other. In addition, the nonvolatile memory spool area 504 is allocated to a spool area 505 for secure print jobs and a spool area 506 for non-secure print jobs at a proportion of 50% each so as not to overlap each other. In an installation environment in which secure print jobs and non-secure print jobs are sent to a printer with substantially the same frequency and amount of data, it is appropriate to allocate the spool areas as half each as described above. By performing such memory management, it is possible to reduce the probability of using the nonvolatile memory spool area in both the case of secure printing and the case of non-secure printing.

Figure 6:
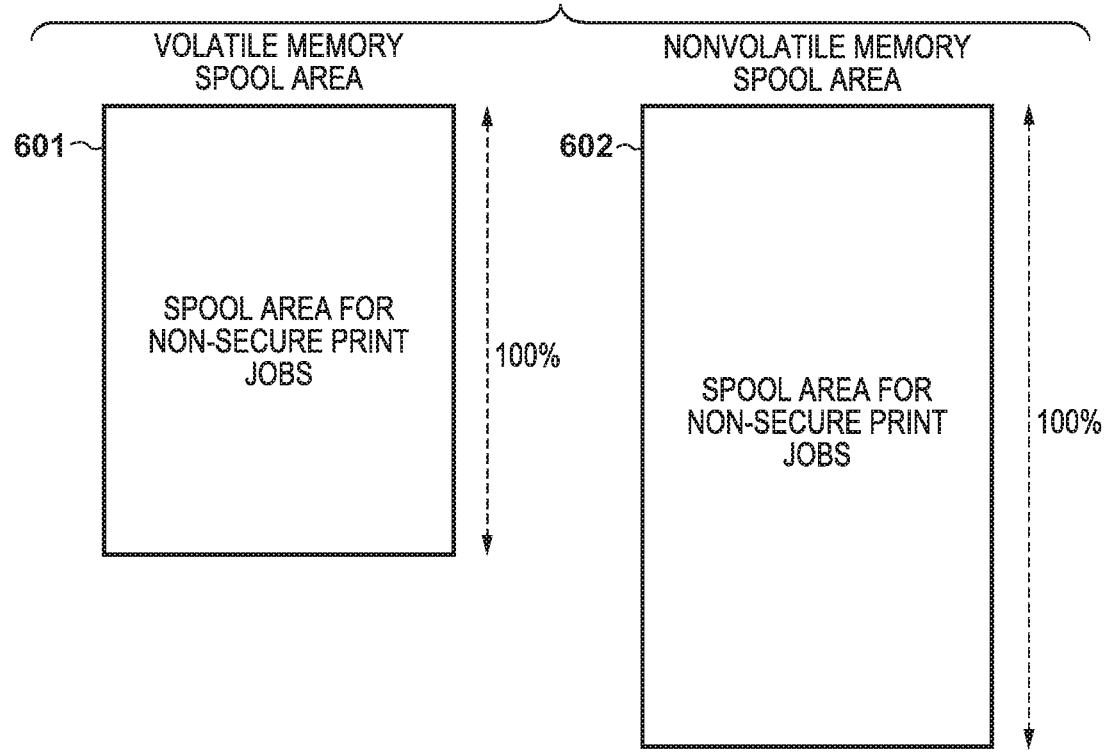
FIG. 6 is a diagram for describing allocation of spool areas.

FIG. 6 is a diagram illustrating a case where 100% of the non-secure print spool area is allocated to a volatile memory spool area 601. For example, when it is not necessary to output secure printing at all in the installation environment of the printer, even if a spool area for secure print jobs is reserved as in FIG. 5, the spool area is not used. Further, in the setting of FIG. 5, in the case where a non-secure print job having large amount of print data is sent to the printer, since the spool area for non-secure print jobs in the volatile memory is only 50% of the whole, the possibility that the print data will be stored in the spool area of the nonvolatile memory increases. As a result, it is more likely for the nonvolatile memory to reach a use count limitation. On the other hand, with the setting of FIG. 6, the memory area can be utilized to the maximum extent, so that the frequency of using the nonvolatile memory can be relatively reduced.

Figure 7:
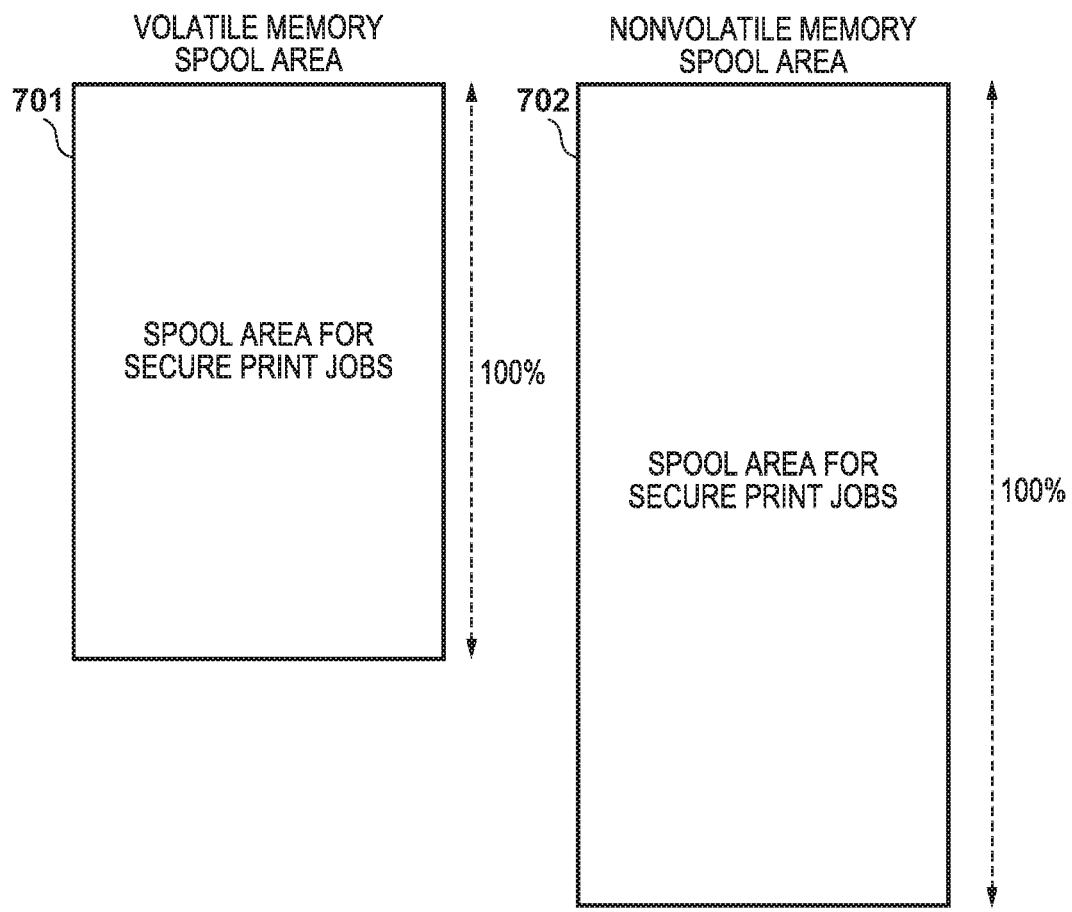
FIG. 7 is a diagram for describing allocation of spool areas.

FIG. 7 is a diagram illustrating a case where 100% of the spool area for secure print jobs is allocated to a volatile memory spool area 701. Depending on the installation environment of the printer, there are cases were all print jobs are set to be securely printed. In such an environment, the frequency of spooling the print data in the nonvolatile memory spool area 702 can be reduced by setting all memory areas as spool areas for secure print jobs.

Figure 8:
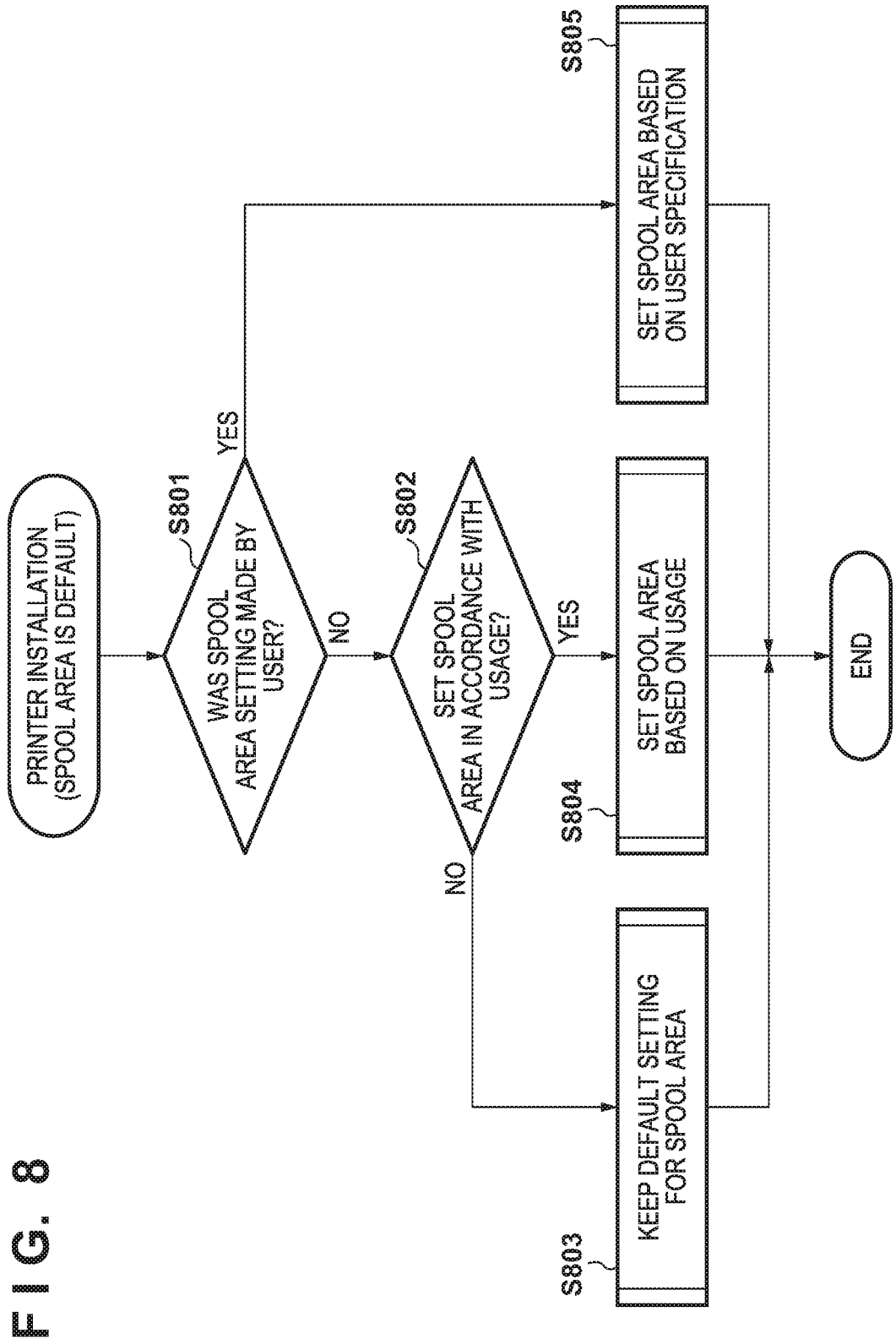
FIG. 8 is a flowchart illustrating a spool area setting process.

Referring to FIG. 8, a method of setting a spool area as described with reference to FIGS. 5, 6, and 7 will be described with reference to the flowchart. The flowchart of FIG. 8 is started, for example, at a time of initial setting of the printer 1, but may be started at an arbitrary timing determined by a user based on a user instruction to the operation panel 104. When the processing of FIG. 8 is started, the spool area is set to a default state specified by, for example, a printer manufacturer. Specifically, the default state is, for example, a state in which the proportion of the spool area for secure print jobs in the volatile memory spool area 701 is the same as the proportion of the spool area for secure print jobs. The process of FIG. 8 is realized by, for example, the CPU of the main controller 101 reading a program stored in the ROM 107 to the RAM 106 and executing the program.

In step S801, the main controller 101 determines whether or not a user has set a spool area. Specifically, the main controller 101 displays on the operation panel 104 a setting screen for asking the user whether or not the user will set the spool area, and accepts an input to the setting screen from the user. Then, the main controller 101 performs this determination based on the accepted input. For example, there are cases where the user is able to grasp in advance the type or the like of print jobs in the printer installation environment. Accordingly, for example, there are cases where a user has previously recognized that all jobs are non-secure print jobs or that all jobs are secure print jobs. In this case, the user gives a user instruction indicating that the user will set the spool areas. When the main controller 101 accepts a user instruction indicating that the user will set the spool areas on the setting screen, the main controller 101 determines that setting of spool areas will be done in accordance with the user, and proceeds to step S805. In contrast, there are cases where a user does not know whether or not all jobs are non-secure print jobs or whether or not all jobs are secure print jobs. Further, for example, there are cases where the user may recognize in advance that there will be both non-secure print jobs and secure print jobs. In this case, the user gives a user instruction indicating that the user will not set the spool areas. When the main controller 101 accepts a user instruction indicating that the user will not set the spool areas on the setting screen, the main controller 101 determines that setting of spool areas will not be performed by the user, and proceeds to step S802.

In step S805, the main controller 101 sets spool areas in accordance with the user's specification. More specifically, the main controller 101 displays on the operation panel 104 a setting screen for asking the user whether the environment is one in which only secure printing is instructed to the printer 1 or one in which only non-secure printing is instructed to the printer 1. Then, the main controller 101 accepts an input to the setting screen from the user. When an input indicating that this is an environment in which only secure printing is instructed to the printer 1 is accepted, memory allocation as illustrated in FIG. 7, for example, is performed. A memory management table for performing memory allocation may be selected from a plurality of tables having different proportions of spool areas for secure print jobs. In addition, 100% of the spool area for secure print jobs does not need to be allocated to the volatile memory spool area 701. At least, the spool area for secure print jobs for the volatile memory spool area 701 may be allocated to be larger than the spool area for non-secure print jobs for the volatile memory spool area 701. For example, configuration may be taken to accept, from a user, designation of an arbitrary proportion of the spool area for secure print jobs with respect to the volatile memory spool area 701. When an input indicating that this is an environment in which only non-secure printing is instructed to the printer 1 is accepted, memory allocation as in FIG. 6, for example, is performed. A memory management table for performing memory allocation may be selected from a plurality of tables having different proportions of spool areas for non-secure print jobs. In addition, 100% of the spool area for non-secure print jobs does not need to be allocated to the volatile memory spool area 701. At least, the spool area for non-secure print jobs for the volatile memory spool area 701 may be allocated to be larger than the spool area for secure print jobs for the volatile memory spool area 701. For example, configuration may be taken to accept, from a user, designation of an arbitrary proportion of the spool area for non-secure print jobs with respect to the volatile memory spool area 701. After step S805, the process of FIG. 8 ends.

When it is determined in step S801 that setting of the spool area will not be performed by a user, in step S802, the main controller 101 determines whether or not to have the printer 1 automatically set the spool area in accordance with the usage of the printer. More specifically, the main controller 101 displays on the operation panel 104 a setting screen for asking a user whether or not to have the printer 1 automatically set a spool area in accordance with the usage of the printer. Then, the main controller 101 accepts an input to the setting screen from the user, and performs the determination in accordance with the accepted content. If it is determined to have the printer 1 automatically set the spool area in accordance with the usage of the printer, the process proceeds to step S804. On the other hand, when it is determined to not have the printer 1 automatically set the spool area in accordance with the usage of the printer, the process proceeds to step S803, and the volatile memory spool area 701 is kept in the default state. After step S803 and step S804, the process of FIG. 8 ends. The determinations of step S801 and step S802 may be performed in accordance with setting content of a setting screen on the operation panel 104.

Figure 12:
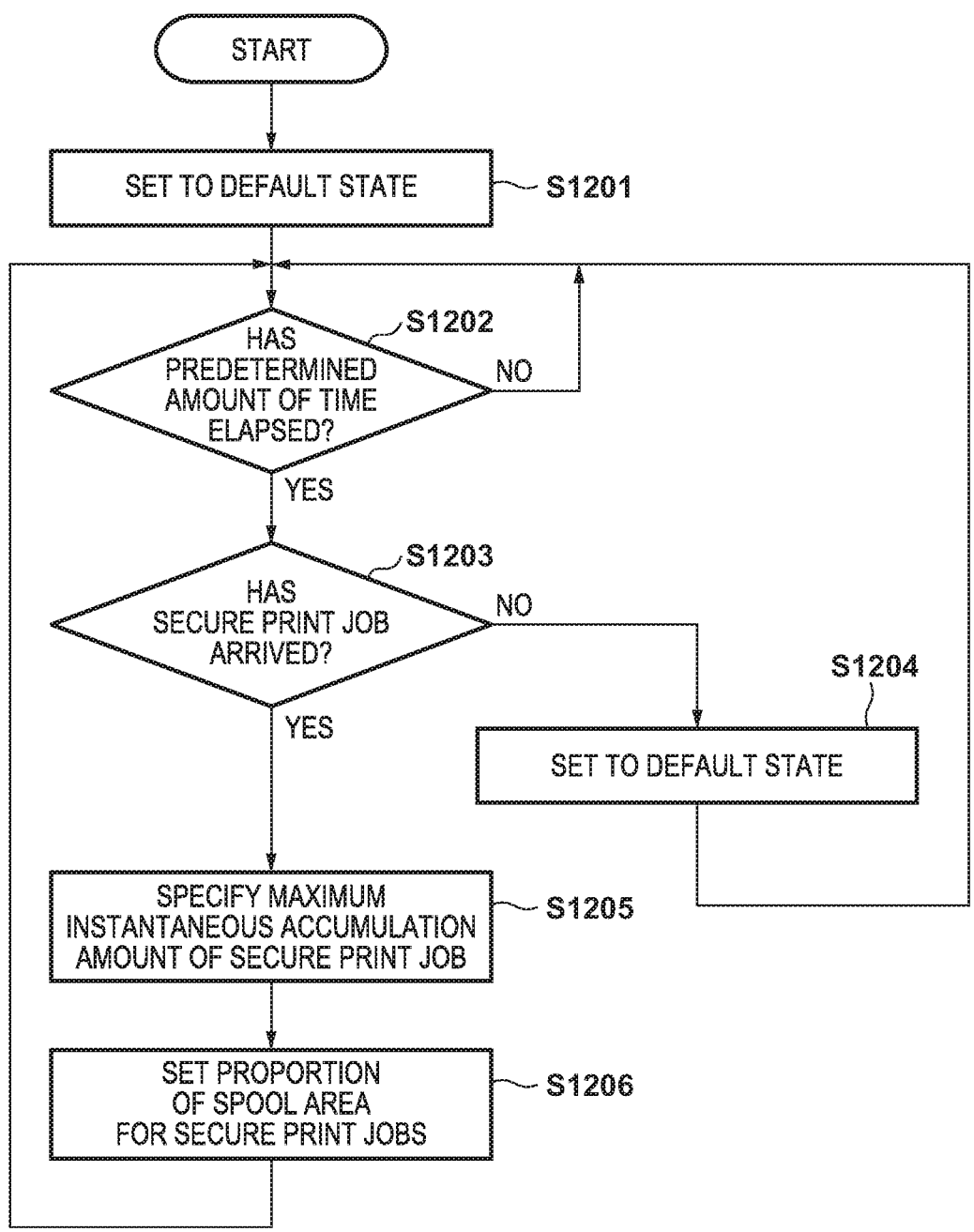
FIG. 12 is a flowchart illustrating a spool area setting process.

Hereinafter, the setting of the spool area in step S804 will be described with reference to the flowchart of FIG. 12. The process of FIG. 12 is realized by, for example, the CPU of the main controller 101 reading a program stored in the ROM 107 to the RAM 106 and executing the program.

In step S1201, the main controller 101 sets the volatile memory spool area 701 to a default state and starts accepting jobs.

In step S1202, the main controller 101 determines whether or not a predetermined amount of time has elapsed since the last time the volatile memory spool area 701 was set. When the predetermined amount of time has elapsed, the main controller 101 proceeds to step S1203. If the predetermined amount of time has not elapsed, this determination is repeated until the predetermined amount of time has elapsed. The predetermined amount of time may be, for example, about one hour or one day or one week. In the present embodiment, since the setting of the volatile memory spool area 701 is repeatedly performed, the time interval from the setting of the volatile memory spool area 701 until the predetermined amount of time elapses comes repeatedly.

In step S1203, the main controller 101 determines whether or not a secure print job has been received in a duration until the predetermined amount of time since the last time the volatile memory spool area 701 was set has elapsed. The main controller 101 proceeds to step S1204 if a secure print job is not received, and proceeds to step S1205 if a secure print job is received.

In step S1204, the main controller 101 sets the volatile memory spool area 701 to a default state, and returns to step S1202.

In step S1205, the main controller 101 specifies a maximum instantaneous accumulation amount for secure print jobs in the volatile memory spool area 701 for a duration until a predetermined period of time has elapsed since the last time the volatile memory spool area 701 was set.

In step S1206, the main controller 101 sets the proportion of the spool area for secure print jobs in the volatile memory spool area 701 based on the maximum instantaneous accumulation amount specified in step S1205. Specifically, the maximum instantaneous accumulation amount specified in step S1205 is set so that the maximum instantaneous accumulation amount fits within the spool area for secure print jobs in the volatile memory spool area 701. Note that, at this point, configuration may be taken to define an upper limit (a predetermined value) for the proportion of the spool area for secure print jobs with respect to the volatile memory spool area 701. More specifically, for example, it is assumed that the upper limit is set to 80%, and the maximum instantaneous accumulation amount specified in step S1205 is an amount corresponding to 80% or more of the volatile memory spool area 701. In this case, the proportion of the spool area for secure print jobs in the volatile memory spool area 701 is set as 80% reflecting the upper limit. Thereafter, the main controller 101 returns to step S1202.

As described above, by repeating the setting of the proportion of the spool area for secure print jobs in the volatile memory spool area 701, it is possible to set an appropriate spool area according to the environment of the printing apparatus 1.

Figure 9:
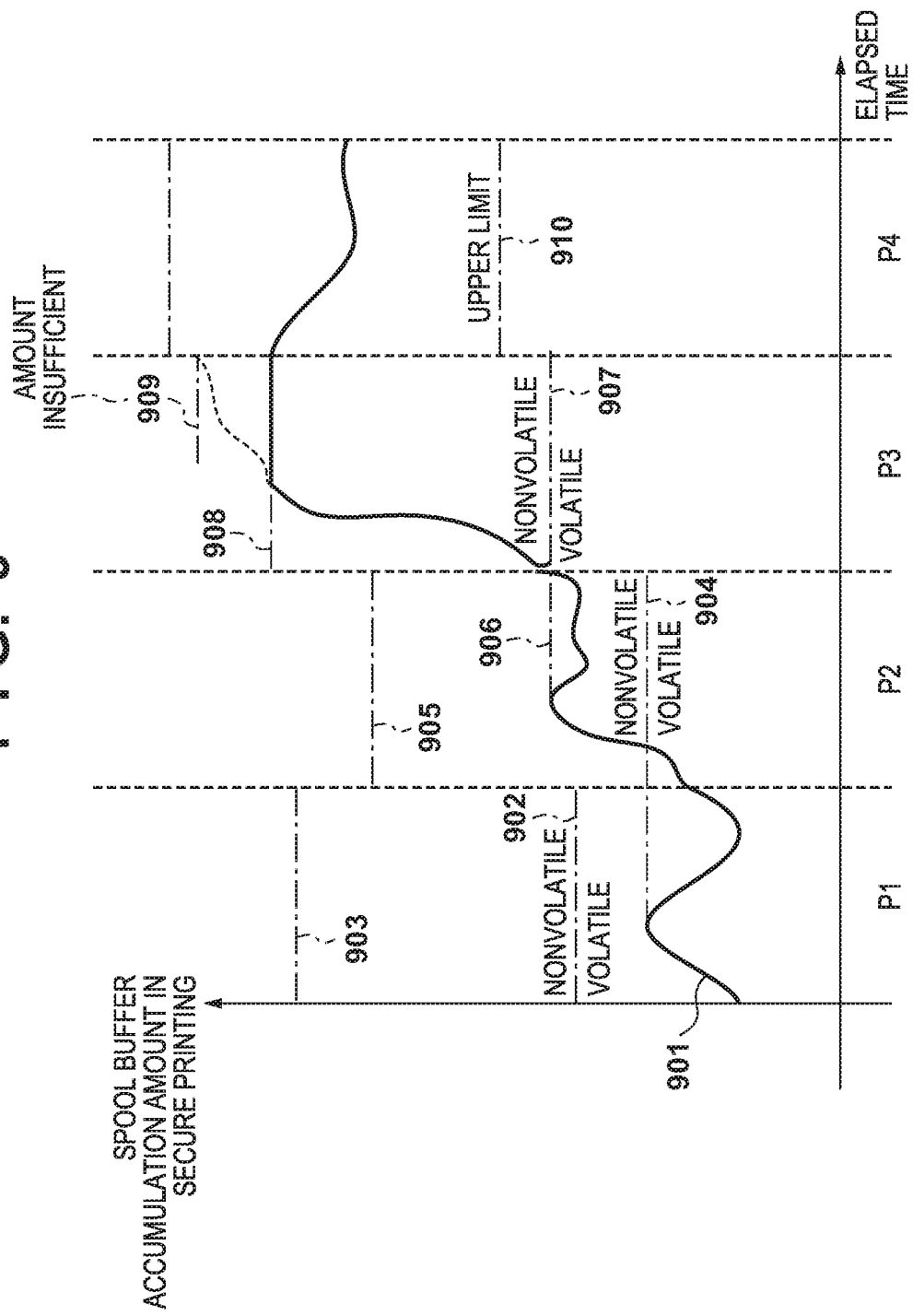
FIG. 9 is a diagram illustrating change in allocation of spool areas according to change in an accumulation amount.

FIG. 9 is a diagram illustrating the environment in which the printer is installed, that is, print job and spool buffer usage along the time axis. The vertical axis represents the amount of spool data accumulated in the spool buffer by the secure printing, and the horizontal axis represents elapsed time. The accumulation amount 901 indicates change in the accumulation amount of spool data. The time on the horizontal axis is divided into P1, P2, P3, and P4 at arbitrary time intervals. The time interval for P1 to P4 may be, for example, about one hour, or one day or one week. The time intervals of the respective periods of time correspond to predetermined amounts of time in the determination of step S1202.

Here, the amount of accumulated spool data in the period of time P1 will be described. The accumulation amount 901 fluctuates within the period of time P1. In the period of time P1, a broken line 902 indicates the capacity of the spool buffer for secure print jobs of the volatile memory, and from the broken line 902 to a broken line 903 indicates the capacity of the spool buffer for secure print jobs of the nonvolatile memory. In the period of time P1, the accumulation amount 901 fluctuates in an area below the broken line 902. This indicates a state where the amount of accumulation in the spool buffer is restrained to equal to or less than the capacity of the spool buffer allocated in the volatile memory in the period of time P1, and the nonvolatile memory is not being used. Therefore, a use count limitation of the nonvolatile memory is not affected. Further, since there is room in the spool buffer for secure print jobs, if the surplus portion can be allocated to the spool buffer for non-secure print jobs, the printer can execute larger print data for a non-secure print job.

Figure 10:
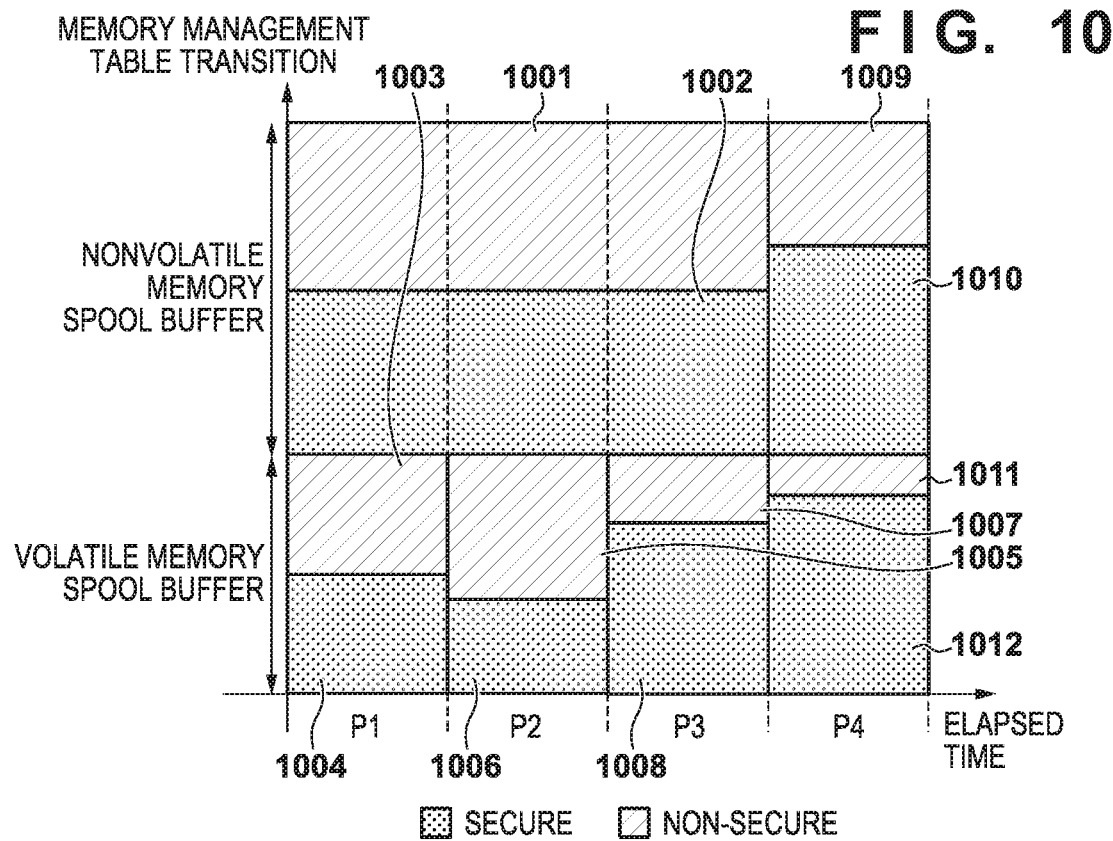
FIG. 10 is a diagram illustrating change in allocation of spool areas that accompanies change in an accumulation amount.

Therefore, in the present embodiment, the setting of the spool area is changed for the period of time P2. That is, for the period of time P2, a maximum value of an accumulation amount for secure print in the spool buffer in the period of time P1 is set as a spool area 904 for the secure print job. FIG. 10 illustrates a state change of spool buffer management.

In FIG. 10, the horizontal axis represents elapsed time, and is divided into P1 to P4 as in FIG. 9. The vertical axis represents the allocation of the spool buffers of the volatile memory and the nonvolatile memory. In the period of time P1, with respect to the spool buffer allocated to the volatile memory, the spool area for secure print jobs is a spool area 1004, and the spool area for non-secure print jobs is the spool area 1003. The spool area for secure print jobs allocated to the nonvolatile memory is a spool area 1002, and the spool area for non-secure print jobs allocated to the nonvolatile memory is a spool area 1001. In the transition from the period of time P1 to the period of time P2, the change of the spool area for secure print jobs in the volatile memory which is indicated by the broken line 904 in FIG. 9 corresponds to the change from the spool area 1004 to a spool area 1006 in FIG. 10. In addition to this, the spool area for non-secure print jobs is changed from the spool area 1003 to the spool area 1005, which is the remaining spool area of the spool buffer of the volatile memory.

In the period of time P2 of FIG. 9, unlike the period of time P1, the accumulation amount 901 of the spool data of the spool buffer by the secure printing is increasing greatly. As an outcome, the spool area of the nonvolatile memory is used by the portion exceeding the broken line 904, which affects the use count limitation of the nonvolatile memory, and is a cause for the product life time to shorten. Therefore, for the period of time P3, the outcome for the period of time P2 is reflected, and the capacity of the spool buffer for secure print jobs in the volatile memory is changed to a broken line 907.

The change from the spool area 1006 to a spool area 1008 in FIG. 10 indicates that a large spool buffer for secure print jobs is reserved, and in return, the spool buffer for non-secure print jobs is reduced from the spool area 1005 to a spool area 1007. Since non-secure printing is printed out as soon as the print data reaches the printer, in comparison to with secure printing, the print data does not remain in the printer long. For this reason, the spool buffer for non-secure print jobs can be set to a relatively small capacity because an operation failure can be prevented if there is at least an area for one job. However, since there are cases where the spool buffer is insufficient during printing, a print job cannot be transmitted to the printer during printing. At this time, print data is held on the host apparatus 156 side, which is the transmission source of the print data.

In the period of time P3 of FIG. 9, the accumulation amount 901 of the spool data of the spool buffer in accordance with secure printing becomes extremely large, and reaches the upper limit of the capacity of the spool buffer of the nonvolatile memory further to the broken line 908 beyond the broken line 907. In FIG. 9, the accumulation amount 901 is illustrated as sticking to the broken line 908 because spooling cannot be performed more than the data amount of the broken line 908. Therefore, as illustrated in FIG. 10, for the period of time P4, the spool buffer for secure print jobs of the volatile memory is expanded to a spool area 1012, and the spool buffer for secure print jobs of the nonvolatile memory is expanded to a spool area 1010. As in the spool area 1011 of FIG. 10, a predetermined amount of the spool buffer for non-secure print jobs may be left, or in an installation environment in which non-secure print jobs do not occur, the spool buffer for non-secure print jobs does not need to be left. In FIGS. 9 and 10, assuming a case where there is a minimum necessary capacity for the spool buffer for non-secure print jobs, the upper limit is set to a broken line 910, and the minimum spool area for non-secure print jobs is reserved as in the spool area 1011.

As illustrated in FIG. 9 and FIG. 10, by observing the accumulation amount of spool data in the spool buffer in accordance with secure printing in a predetermined period of time and setting the spool area in accordance with the outcome, it is possible to reserve the spool buffer according to the actual state of use of the printer 1. As a result, it is possible to suppress an increase in chances of writing to the nonvolatile memory.

In FIGS. 9 and 10, the allocation of the spool area in the next period of time is changed based on the maximum value of the accumulation amount of spool data of the spool buffer by the secure printing in a predetermined period of time, but the allocation may be changed in accordance with another method. For example, the change in the latest plurality of periods of time may be approximated to derive a new allocation. Further, for example, configuration may be taken to record change in the spool buffer amount over a year, and change the spool area at each predetermined amount of time of the year.

As described above, the processing of dynamically allocating spool areas of the volatile memory and the nonvolatile memory that are reserved as a spool buffer for secure print jobs or for non-secure print jobs has been described. In non-secure printing, after a print job is generated and sent to the printer, the spool memory area used for the job is immediately released when printing is completed. Therefore, by temporarily reserving the spool area for non-secure print jobs in the volatile memory, it is possible to further suppress an increase in writes to the nonvolatile memory.

Figure 11:
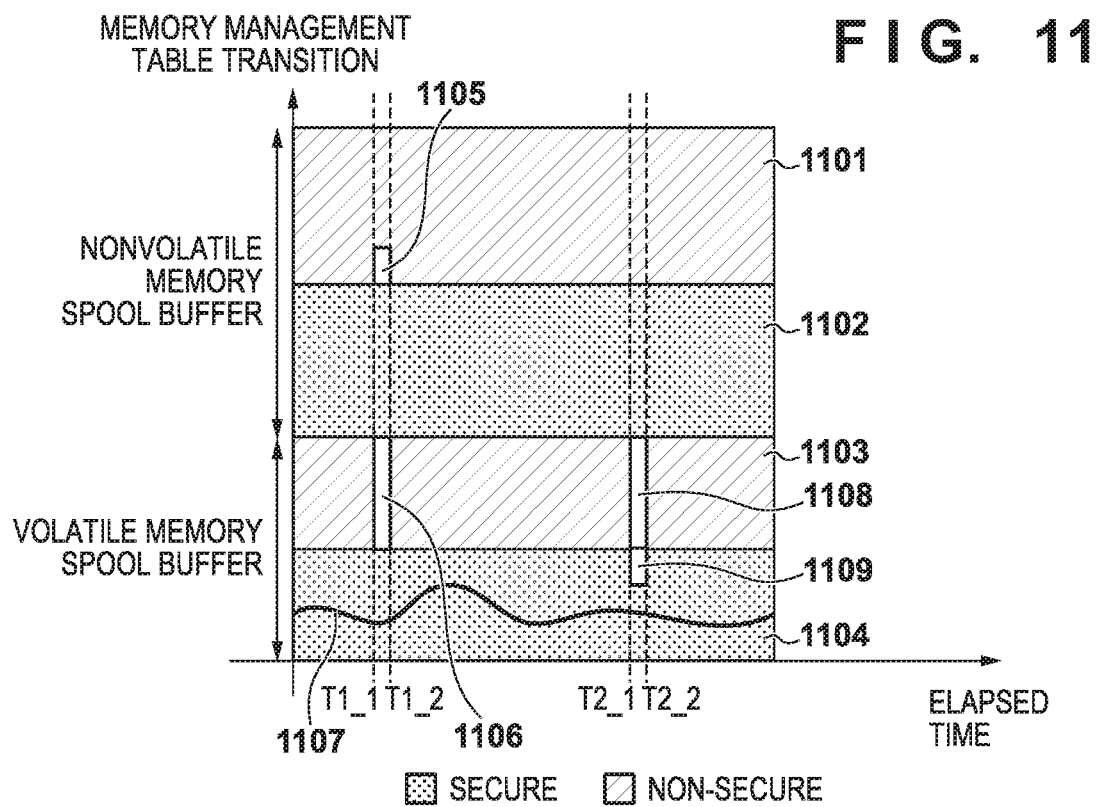
FIG. 11 is a diagram illustrating change in allocation of spool areas that accompanies change in an accumulation amount.

In FIG. 11, similarly to FIG. 10, the vertical axis represents the allocation of the spool buffers of the volatile memory and the nonvolatile memory, and the horizontal axis represents the elapsed time. A spool area 1101 is a spool area for non-secure print jobs of the nonvolatile memory, and a spool area 1102 is a spool area for secure print jobs of the nonvolatile memory. A spool area 1103 is a spool area for non-secure print jobs of the volatile memory, and a spool area 1104 is a spool area for secure print jobs of the volatile memory. An accumulation amount 1107 indicates temporal change of the accumulation amount in the spool area for secure print jobs.

Here, it is assumed that a non-secure print job is generated at the time T1_1. The amount of data of the non-secure print job is an amount obtained by combining data 1105 and data 1106. Since the data 1106 matches the upper limit of the capacity of the spool buffer for non-secure print jobs reserved in the volatile memory, data of a portion that exceeds this upper limit is written as the data 1105 in the spool area of the nonvolatile memory.

Since the printing is completed at T1_2, the data 1105 and 1106 of the non-secure print job cease to be present, and the spool area is released. Here, it is considered that the writing of the data 1105 is performed in the volatile memory instead of the nonvolatile memory. The accumulation amount 1107 is sufficiently smaller than the area of a spool area 1104 reserved in T1_1, and even if the data of the data 1105 is stored in the volatile memory, the spool data stored in the spool area for secure print jobs is not destroyed.

Therefore, in T2_1, data 1109 for the non-secure print job is temporarily stored in the spool area for secure print jobs after checking the free area of the spool area for secure print jobs. That is, a spool area 1103 for the non-secure print job is temporarily expanded only between T2_1 and T2_2 which is when the non-secure printing completes, and data 1108 and 1109 are all stored in the volatile memory. By controlling in this manner, it is possible to further suppress an increase in writing of data to the nonvolatile memory.

FIG. 9 illustrates a state in which, when the spool area for secure print jobs is switched to a decided post-switch spool area, the amount of spool data is smaller than the decided post-switch spool area. However, in actual usage, there are cases where the amount of spool data remaining at the time of switching a spool area may be larger than the decided post-switch spool area. In such a case, it is sufficient to wait for a timing at which the spool data decreases in accordance with print output and becomes equal to or lower than the decided post-switch spool area, and to execute the switching at that time. Alternatively, configuration may be taken to mandatorily accept an instruction from a user to delete spool data, and perform switching in accordance with the instruction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-010539, filed Jan. 24, 2019, which is hereby incorporated by reference herein in its entirety.

What is claimed is:

1. A printing apparatus having a predetermined memory used as a spool buffer for print jobs, the apparatus comprising:
at least one processor that executes instructions to operate as:
an acceptance unit configured to accept an input related to a secure print job;
a control unit configured to control a size of a spool area for secure print jobs in the predetermined memory in response to an input related to the accepted secure print job; and
a printing unit configured to execute secure printing based on the secure print job in response to a user operation on the printing apparatus being performed after the secure print job is transmitted from an information processing apparatus,
wherein the printing unit is capable of executing non-secure printing based on a non-secure print job without a user operation being performed on the printing apparatus after the non-secure print job is transmitted from the information processing apparatus,
acceptance of the input related to the secure print job is acceptance of an input indicating that an environment of the printing apparatus is an environment in which secure printing is executed more than non-secure printing, and
the control unit, in response to the accepted input related to the secure print job, performs control so that the size of the spool area for secure print jobs in the predetermined memory becomes larger than a size of a spool area for non-secure print jobs in the predetermined memory.

2. The printing apparatus according to claim 1, wherein, when an input indicating that the environment of the printing apparatus is an environment for executing secure printing more than non-secure printing is accepted, the control unit performs control so that all spool areas in the predetermined memory are the spool area for secure print jobs.

3. The printing apparatus according to claim 1, wherein, when an input indicating that the environment of the printing apparatus is an environment for executing non-secure printing more than secure printing is accepted, the control unit performs control so that the size of the spool area for non-secure print jobs in the predetermined memory becomes greater than the size of the spool area for secure print jobs in the predetermined memory.

4. The printing apparatus according to claim 3, wherein, when an input indicating that the environment of the printing apparatus is an environment for executing non-secure printing more than secure printing is accepted, the control unit performs control so that all spool areas in the predetermined memory are the spool area for non-secure print jobs.

5. The printing apparatus according to claim 1, wherein when an input related to the secure print job is not accepted, the size of the spool area for non-secure print jobs in the predetermined memory is controlled to be the same as the size of the spool area for secure print jobs in the predetermined memory.

6. The printing apparatus according to claim 1, wherein the at least one processor further executes instructions to operate as a deletion unit configured to, if printing based on the secure print job included in the spool area for secure print jobs in the predetermined memory has been executed, delete the secure print job based on the executed print from the spool area for secure print jobs in the predetermined memory.

7. The printing apparatus according to claim 1, wherein the predetermined memory is a volatile memory.

8. A printing apparatus having a predetermined memory used as a spool buffer for print jobs, the apparatus comprising:
at least one processor that executes instructions to operate as:
an acceptance unit configured to accept an input related to a secure print job;
a control unit configured to control a size of a spool area for secure print jobs in the predetermined memory in response to an input related to the accepted secure print job; and
a printing unit configured to execute secure printing based on the secure print job in response to a user operation on the printing apparatus being performed after the secure print job is transmitted from an information processing apparatus, wherein
the acceptance of input relating to the secure print job is the reception of the secure print job in a predetermined period of time,
based on the secure print job received in the predetermined period of time, the control unit controls the size of the spool area for secure print jobs in the predetermined memory for a specific period of time after the predetermined period of time.

9. The printing apparatus according to claim 8, wherein, based on a maximum instantaneous accumulation amount of the secure print job in the predetermined memory during the predetermined period of time, the control unit controls the size of the spool area for secure print jobs in the predetermined memory in the specific period of time.

10. The printing apparatus according to claim 9, wherein the control unit performs control so that the size of the spool area for secure print jobs in the predetermined memory for the specific period of time becomes a size that enables the maximum instantaneous accumulation amount of the secure print job in the predetermined memory during the predetermined period of time to be stored.

11. The printing apparatus according to claim 9, wherein, if the maximum instantaneous accumulation amount of the secure print job in the predetermined memory during the predetermined period of time is greater than a predetermined value, the control unit performs control so that the size of the spool area for secure print jobs in the predetermined memory becomes a size that enables an amount of data of the predetermined value to be stored.

12. The printing apparatus according to claim 8, wherein the printing unit is capable of executing non-secure printing based on a non-secure print job without a user operation being performed on the printing apparatus after the non-secure print job is transmitted from the information processing apparatus, and in the predetermined period of time, the control unit performs control so that the size of the spool area for non-secure print jobs in the predetermined memory is the same as the size of the spool area for secure print jobs in the predetermined memory.

13. The printing apparatus according to claim 8, wherein, based on a maximum instantaneous accumulation amount of the secure print job in the predetermined memory during the specific period of time, the control unit controls the size of the spool area for secure print jobs in the predetermined memory in a period of time after the specific period of time.

14. The printing apparatus according to claim 8, wherein the at least one processor further executes instructions to operate as a deletion unit configured to, if printing based on the secure print job included in the spool area for secure print jobs in the predetermined memory has been executed, delete the secure print job based on the executed print from the spool area for secure print jobs in the predetermined memory.

15. The printing apparatus according to claim 8, wherein the predetermined memory is a volatile memory.

16. A printing apparatus having a predetermined memory used as a spool buffer for print jobs, the apparatus comprising:

at least one processor that executes instructions to operate as:

an acceptance unit configured to accept an input related to a secure print job;

a control unit configured to control a size of a spool area for secure print jobs in the predetermined memory in response to an input related to the accepted secure print job; and a printing unit configured to execute secure printing based on the secure print job in response to a user operation on the printing apparatus being performed after the secure print job is transmitted from an information processing apparatus;

a storage unit configured to, if the secure print job whose amount of data is greater than or equal to an amount that corresponds to the size of the spool area for secure print jobs in the predetermined memory is received, store the secure print job in a specific memory different from the predetermined memory.

17. The printing apparatus according to claim 16, wherein the specific memory is a nonvolatile memory.

18. The printing apparatus according to claim 16, wherein the at least one processor further executes instructions to operate as a deletion unit configured to, if printing based on the secure print job included in the spool area for secure print jobs in the predetermined memory has been executed, delete the secure print job based on the executed print from the spool area for secure print jobs in the predetermined memory.

19. The printing apparatus according to claim 16, wherein the predetermined memory is a volatile memory.

* * * * *